July 10, 1962   R. B. WISBEY   3,043,030
APPARATUS FOR REMOVING SLUDGE FROM SLUDGE COLLECTING BEDS
Filed May 4, 1961   3 Sheets-Sheet 1
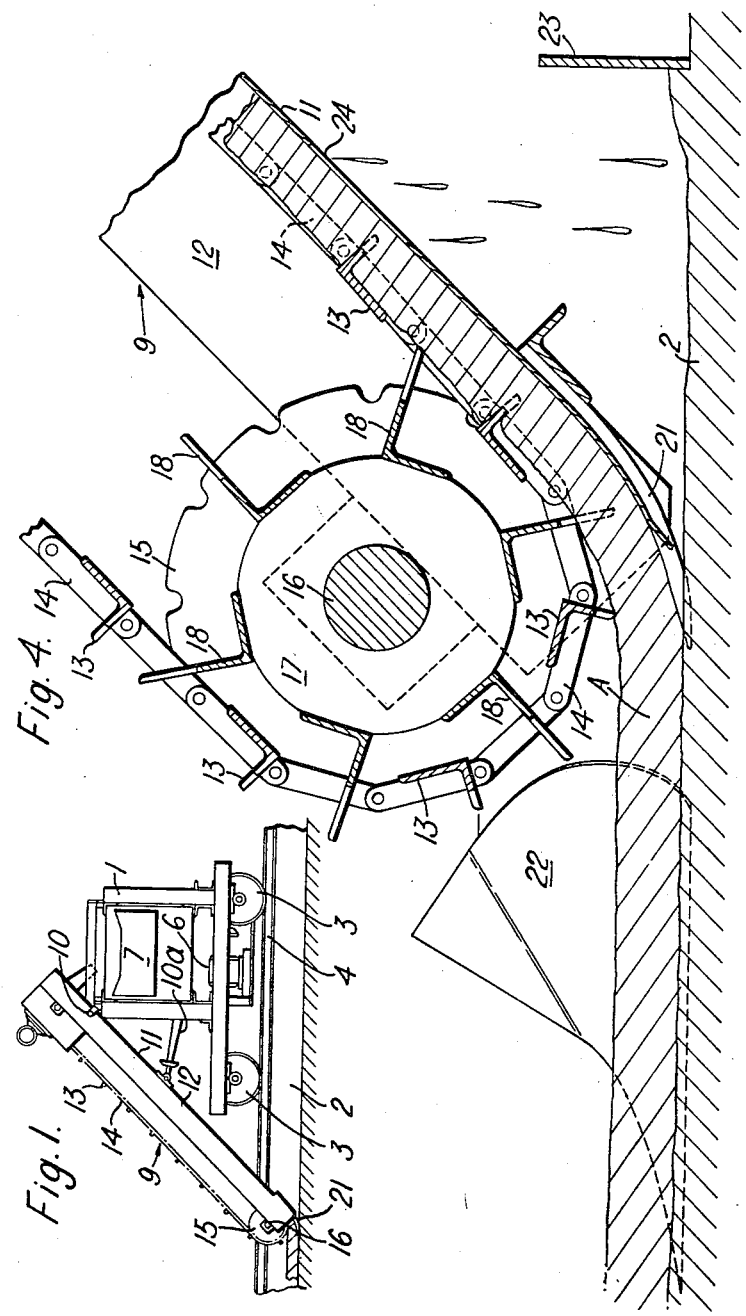
Inventor
Ronald Bertram Wisbey
By
Stevens, Davis, Miller & Mosher
Attorneys

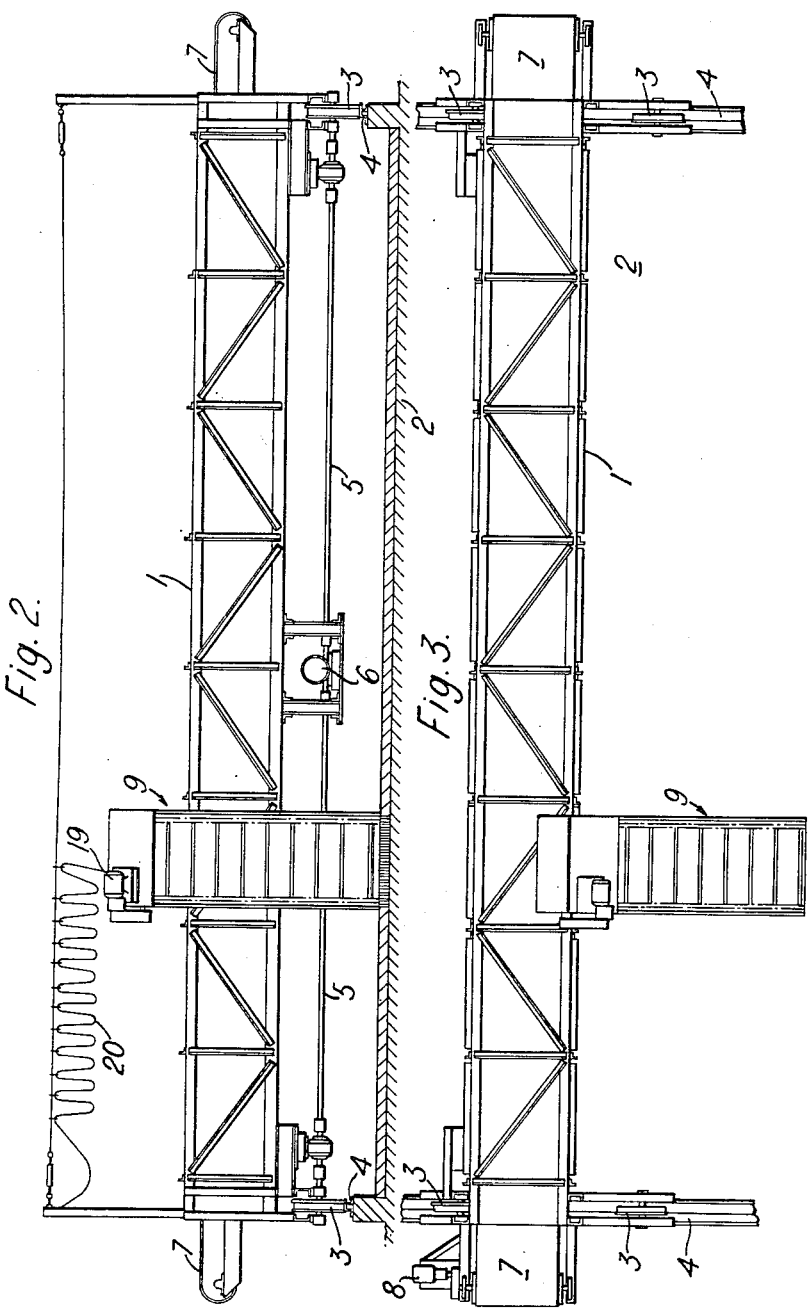

United States Patent Office 3,043,030
Patented July 10, 1962

3,043,030
APPARATUS FOR REMOVING SLUDGE FROM SLUDGE COLLECTING BEDS
Ronald B. Wisbey, Slough, England, assignor to Templewood Hawksley Limited, Slough, England
Filed May 4, 1961, Ser. No. 107,670
7 Claims. (Cl. 37—192)

This invention relates to apparatus for removing sewage sludge from sludge drying beds, of the kind comprising a gantry spanning the width of the bed, means on the gantry for displacing it along the length of the bed, and an elevator with cross slats or cross bars for engaging and elevating and depositing for its removal the sludge of the bed.

It has already been proposed to employ an elevator comprising a stationary trough and co-acting cross bars carried by endless side chains, the elevator having its upper end pivotally mounted for the purpose of angularly adjusting its working depth and having at its lower end an inclined scoop.

We have found that the engagement of the bed sludge by such a scoop as the gantry is displaced frequently fails to result in adequate transference of the sludge to the elevator. In the course of drying on the bed the sludge tends to crack or develop fissures and is reduced to elongated fragments each of relatively narrow width. These fragments are quite light in weight and so the advancing scoop merely pushes them forward over the bed instead of scooping or shovelling them upwards into the path of the elevator as is required.

From experiment and research we have ascertained that the aforesaid disadvantage can be appreciably lessened by means of an inclined forked digger arranged at the bottom of the elevator in such a manner that the points of the tines or prongs will be below the line of engagement with the sludge of each elevator cross bar during the operation of the apparatus. Then, by adjusting the said points at a level just sufficient to enter the bed below the sludge and by having the speed of travel of the elevator cross bars greater than the speed of travel of the gantry, the sludge material is immediately engaged by the elevator cross bars and drawn up the elevator trough; any particles of ash, sand or clinker from the bed clinging to the underside of the lifted sludge fall back between the tines or prongs of the fork, and also through slots in the base of the elevator trough if such slots are provided.

Preferably a levelling plate or roller is supported in rear of the elevator and functions to level the drying bed ready for reuse either while picking up sludge or on the return journey of the apparatus.

In conjunction with the combined forked digger and elevator we may employ auxiliary revolving bars arranged to engage the sludge of the bed either alternately with the cross bars of the elevator or slightly in advance of the forked digger. In the former case the auxiliary bars may be arranged to rotate about the lower axle of the elevator endless chains; in the other case the auxiliary bars may project from a separate suitably mounted and driven axle.

Furthermore, we may employ at each side of the bottom of the elevator a plough-like deflector shaped so as to engage under and to lift the sludge at each side edge of the elevator and turn it laterally inwards.

Our invention is applicable to sludge removing apparatus in which one combined forked digger and elevator as aforesaid is mounted for cross-wise displacement on the gantry. With this arrangement, after moving the gantry along the bed with the digger and elevator in a position to pick up a strip of sludge, the digger and elevator is moved a step cross-wise and the operation is repeated.

In such an arrangement the elevator may deliver into a receiver to be emptied from time to time or on to an endless conveyor extending along the gantry and delivering into a vehicle or on to a belt conveyor travelling along beside the bed parallel with the travel of the gantry.

Our invention is also applicable to sludge removing apparatus in which a plurality of combined forked diggers and elevators as aforesaid are mounted side-by-side right across the gantry so as to operate over the whole width of the bed simultaneously.

Preferably there are separate electric motors on the gantry for driving respectively the gantry, the endless elevator or elevators and for the cross conveyor or receiver. Traversing the single traversing elevator, when such is employed, is preferably done by hand as is raising and lowering of the digger in this case.

By way of example one embodiment of our invention is illustrated on the accompanying drawings, whereon:

FIGS. 1, 2 and 3 are respectively a side elevation, a front elevation and a plan of this embodiment;

FIG. 4 shows on a larger scale and in sectional elevation the lower end of the sludge elevator.

Figure 5:
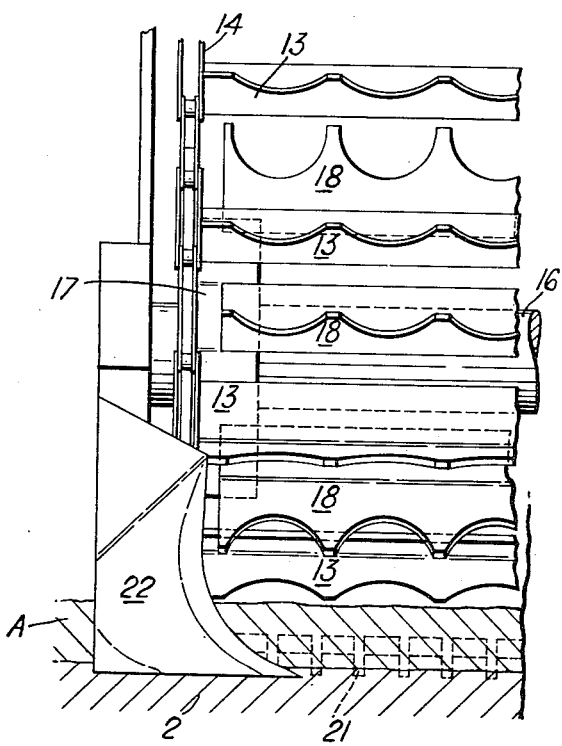
FIG. 5 is a fragmentary front view corresponding to FIG. 4.

As illustrated, reference 1 denotes a gantry spanning the width of the sludge drying bed 2 and supported on wheels 3 arranged to run on rails 4 at the raised sides of the bed. The wheels 3 are driven through shafts 5 from an electric motor 6 for example. An endless belt conveyor 7 extends along the gantry, being supported on suitable rollers, and is arranged to be driven, as and when required, by an electric motor 8.

A sludge elevator, generally denoted 9, is carried by the gantry in a manner which enables it to be displaced by hand to different working positions across the gantry; the elevator is pivotally supported at 10 and its working depth is adjustable by varying, by means of a device 10a, its inclination to the vertical.

The elevator 9 includes a trough, having a bottom wall 11 and side walls 12, and coacting cross bars 13 carried by endless side chains 14 that run over upper sprocket wheels (not shown) and lower sprocket wheels 15 secured on a shaft 16. Also rotatable with the shaft 16 are discs 17 which have spaced auxiliary cross bars 18 (see especially FIGS. 4 and 5). The bars 13 displaceable with the endless side chains 14, and the bars 18 rotatable about the axis of the shaft 16 are in the form of angle irons, at least the bars 18 and preferably also the bars 13 having the projecting webs scalloped or corrugated in the manner shown and for a reason hereinafter explained. In the illustrated embodiment the chains 14 are driven by an electric motor 19 (FIG. 2) to which current is supplied from a suitable source via a flexible conductor 20.

At the foot of the elevator trough there is an inclined forked digger 21 so arranged (see FIG. 4) that the points of its tines or prongs are practically below the line of engagement with the sludge A of each cross bar 13 and 18 during the operation of the apparatus.

Further, at each side of the bottom of the elevator trough, and in advance of the aforesaid point of engagement of the cross bars, there is a plough-like deflector 22 shaped so as to engage under the lift the sludge at each side of the elevator trough and turn it laterally inwards into the paths of movement of the cross bars 13 and 18. It will be readily understood that the auxiliary cross bars 18 engage the sludge of the bed alternately with the cross bars 13 and very slightly in advance of the forked digger 21.

23 denotes a levelling plate supported at the rear of the elevator, the function of which is to level the drying bed 2 for re-use, as or after the sludge A is elevated from the bed. Instead of a levelling plate we may employ a levelling roller for the same purpose.

The operation of the described apparatus is as follows:

With the elevator 9 set as shown so that the tines of the forked digger 21 will just engage under the thickness of sludge on the drying bed, and with the elevator chain 14 being driven, the gantry 1 is moved lengthwise of the bed, whereby the digger 21 and elevator 9 pick up and elevate a strip of the sludge. The cross bars 13 carry the picked-up sludge up the elevator trough 11, 12 and deposit it on the conveyor 7 whence it is conveyed to one end of the gantry and delivered, for example, into a vehicle travelling along beside the bed in keeping with the travel of the gantry. After removal of a strip of sludge in this manner the combined digger and elevator 21, 9 is moved a step cross-wise and the operation is repeated, and so on. Any particles of ash, sand or clinker from the bed that may be picked up with the sludge fall back between the tines or prongs of the digger 21 and also through apertures 24 (FIG. 4) made in the bottom 11 of the elevator trough. As or after the elevator advances lengthwise of the drying bed the levelling plate 23 levels the surface of the bed from which the strip of sludge is being removed.

The cross bars 13 and 18 are scalloped as shown to facilitate their penetration into the sludge and lessen strain imposed on the elevator chain driving mechanism.

Although we have described and illustrated one embodiment of our invention by way of example, it will now be understood by those skilled in the art that many modifications, including those mentioned in the introduction to this specification, may be made within the scope of the invention as defined by the claims that follow.

I claim:

1. Apparatus for removing sewage sludge from sludge drying beds, said apparatus comprising a gantry adapted to be disposed above the bed and span the bed transversely, means adapted to move said gantry when so disposed along the length of the bed, and a sludge lifter and elevator mounted on said gantry to reach down to the bed at an inclination forward of the direction of forward movement of the gantry along the length of the bed, said elevator comprising a trough having a bottom wall and two side walls, a shaft at the upper end of said trough, a shaft at the lower end of said trough, a pair of sprocket wheels mounted on each of said shafts at each end of said trough with one sprocket of each pair located inwardly of and adjacent each said side wall and the periphery thereof spaced above said bottom wall of the trough, an endless chain entrained about the two sprockets located adjacent each said side wall, cross bars disposed transversely of said trough and mounted between the two endless chains at spaced intervals throughout the chain lengths, said cross bars including webs projecting outwardly of said chains but short of the bottom wall of the trough along the lower reach defined by said chains, means for driving said upper shaft in a direction moving the lower reach defined by said chains in an upward direction, and a forked digger at the lower end of said trough bottom with the tines of the fork extending forwardly of said lower end to an extent where the tips thereof are substantially directly below a line along which each said cross bar web would initially engage sludge during operation of the apparatus.

2. In apparatus for lifting and elevating for disposal sludge dried on a sludge drying bed and comprising a gantry adapted to straddle said bed transversely and be progressed lengthwise of said bed, and an elevator mounted on said gantry to reach down to the bed in a direction transverse to the gantry and inclined forwardly relative to the direction of forward gantry movement, said elevator comprising a trough with a bottom wall and side walls and endless chains spaced transversely of said trough and carrying spaced cross bars having webs adapted to engage sludge and move it up said trough for disposal, the provision at the lower end of said trough of a forked digger whereof the tines extend forwardly from said lower edge to engage beneath the sludge with the points of said tines substantially directly below the line of initial engagement of the sludge by said cross bars.

3. Apparatus for removing sewage sludge from sludge drying beds, said apparatus comprising a gantry adapted to be disposed above the bed and span the bed transversely, means adapted to move said gantry when so disposed along the length of the bed, and a sludge lifter and elevator mounted on said gantry to reach down to the bed at an inclination forward of the direction of forward movement of the gantry along the length of the bed, said elevator comprising a trough having a bottom wall and two side walls, said bottom wall being apertured, a shaft at the upper end of said trough, a shaft at the lower end of said trough, a pair of sprocket wheels mounted on each of said shafts at each end of said trough with one sprocket of each pair located inwardly of and adjacent each said side wall and the periphery thereof spaced above said bottom wall of the trough, an endless chain entrained about the two sprockets located adjacent each said side wall, cross bars disposed transversely of said trough and mounted between the two endless chains at spaced intervals throughout the chain lengths, said cross bars including webs projecting outwardly of said chains but short of the bottom wall of the trough along the lower reach defined by said chains, means for driving said upper shaft in a direction moving the lower reach defined by said chains in an upward direction, and a forked digger at the lower end of said trough bottom with the tines of the fork extending forwardly of said lower end to an extent where the tips thereof are substantially directly below a line along which each said cross bar web would initially engage sludge during operation of the apparatus, at which time residual bed lining material entrained by the lifted sludge can fall through said apertured bottom of the trough.

4. In apparatus for lifting and elevating for disposal sludge dried on a sludge drying bed and comprising a gantry adapted to straddle said bed transversely and be progressed lengthwise of said bed, and an elevator mounted on said gantry to reach down to the bed in a direction transverse to the gantry and inclined forwardly relative to the direction of forward gantry movement, said elevator comprising a trough with a bottom wall and side walls and endless chains spaced transversely of said trough and carrying spaced cross bars having webs adapted to engage sludge and move it up said trough for disposal, the provision at the lower end of said trough of a forked digger whereof the tines extend forwardly from said lower edge to engage beneath the sludge with the points of said tines substantially directly below the line of initial engagement of the sludge by said cross bars, and said bottom wall being apertured for the purpose of enabling falling therethrough for return to said bed of bed lining material entrained by the moving sludge.

5. Apparatus for removing sewage sludge from sludge drying beds, said apparatus comprising a gantry adapted to be disposed above the bed and span the bed transversely, means adapted to move said gantry when so disposed along the length of the bed, and a sludge lifter and elevator mounted on said gantry to reach down to the bed at an inclination forward of the direction of forward movement of the gantry along the length of the bed, means for adjusting said inclination of said elevator, said elevator comprising a trough having a bottom wall and two side walls, said bottom wall being apertured, a shaft at the upper end of said trough, a shaft at the lower end of said trough, a pair of sprocket wheels mounted on each of said shafts at each end of said trough with one sprocket of each pair located inwardly of and adjacent each said side wall and the periphery thereof spaced above said bottom wall of the trough, an endless chain entrained about the two sprockets located adjacent each said side wall, first cross bars disposed transversely of said trough and mounted between the two endless chains at spaced intervals throughout the chain lengths, said first cross bars including webs projecting outwardly of said chains but short of the bottom wall of the trough along the lower reach defined by said chains, a pair of discs mounted in spaced apart relationship on said lower shaft, second cross bars disposed transversely of said trough and mounted between said two discs at spaced intervals circumferentially of said discs, said second cross bars including webs projecting outwardly of said chains to an extent at least slightly greater than that of the projection of said webs of said first cross bars but short of said bottom wall of the trough at the lower part of the disc peripheries, said first and said second cross bars being so relatively disposed that they alternate with one another where said chains extend about said lower shaft, means for driving said upper shaft in a direction moving the lower reach defined by said chains in an upward direction, and a forked digger at the lower end of said trough bottom with the tines of the fork extending forwardly of said lower end to an extent where the tips thereof are substantially directly below a line along which each said first cross bar web would initially engage sludge during operation of the apparatus, at which time residual bed lining material entrained by the lifted sludge can fall through said apertured bottom of the trough.

6. Apparatus for removing sewage sludge from sludge drying beds, said apparatus comprising a gantry adapted to be disposed above the bed and span the bed transversely, means adapted to move said gantry when so disposed along the length of the bed, and a sludge lifter and elevator mounted on said gantry to reach down to the bed at an inclination forward of the direction of forward movement of the gantry along the length of the bed, means for adjusting said inclination of said elevator, said elevator comprising a trough having a bottom wall and two side walls, a shaft at the upper end of said trough, a shaft at the lower end of said trough, a pair of sprocket wheels mounted on each of said shafts at each end of said trough with one sprocket of each pair located inwardly of and adjacent each said side wall and the periphery thereof spaced above said bottom wall of the trough, an endless chain entrained about the two sprockets located adjacent each said side wall, first cross bars disposed transversely of said trough and mounted between the two endless chains at spaced intervals throughout the chain lengths, said first cross bars including webs projecting outwardly of said chains but short of the bottom wall of the trough along the lower reach defined by said chains, a pair of discs mounted in spaced apart relationship on said lower shaft, second cross bars disposed transversely of said trough and mounted between said two discs at spaced intervals circumferentially of said discs, said second cross bars including webs projecting outwardly of said chains to an extent at least slightly greater than that of the projection of said webs of said first cross bars but short of said bottom wall of the trough at the lower part of the disc peripheries, said first and said second cross bars being so relatively disposed that they alternate with one another where said chains extend about said lower shaft, means for driving said upper shaft in a direction moving the lower reach defined by said chains in an upward direction, and a forked digger at the lower end of said trough bottom with the tines of the fork extending forwardly of said lower end to an extent where the tips thereof are substantially directly below a line along which each said first cross bar web would initially engage sludge during operation of the apparatus, the free edges of said webs of said first and second cross bars being scalloped to facilitate penetration of said webs into the sludge during operation of the apparatus.

7. Apparatus for removing sewage sludge from sludge drying beds, said apparatus comprising a gantry adapted to be disposed above the bed and span the bed transversely, means adapted to move said gantry when so disposed along the length of the bed, and a sludge lifter and elevator mounted on said gantry to reach down to the bed at an inclination forward of the direction of forward movement of the gantry along the length of the bed, said elevator comprising a trough having a bottom wall and two side walls, said bottom wall being apertured, a shaft at the upper end of said trough, a shaft at the lower end of said trough, a pair of sprocket wheels mounted on each of said shafts at each end of said trough with one sprocket of each pair located inwardly of and adjacent each said side wall and the periphery thereof spaced above said bottom wall of the trough, an endless chain entrained about the two sprockets located adjacent each said side wall, first cross bars disposed transversely of said trough and mounted between the two endless chains at spaced intervals throughout the chain lengths, said first cross bars including webs projecting outwardly of said chains but short of the bottom wall of the trough along the lower reach defined by said chains, a pair of discs mounted in spaced apart relationship on said lower shaft, second cross bars disposed transversely of said trough and mounted between said two discs at spaced intervals circumferentially of said discs, said second cross bars including webs projecting outwardly of said chains to an extent at least slightly greater than that of the projection of said webs of said first cross bars but short of said bottom wall of the trough at the lower part of the disc peripheries, said first and said second cross bars being so relatively disposed that they alternate with one another where said chains extend about said lower shaft, the free edges of said webs of said first and second cross bars being scalloped to facilitate penetration of said webs into the sludge during operation of the apparatus, means for driving said upper shaft in a direction moving the lower reach defined by said chains in an upward direction, a forked digger at the lower end of said trough bottom with the tines of the fork extending forwardly of said lower end to an extent where the tips thereof are substantially directly below a line along which each said first cross bar web would initially engage sludge during operation of the apparatus, at which time residual bed lining material entrained by the lifted sludge can fall through said apertured bottom of the trough and a plough-like deflector at each side of said lower end of said trough bottom, said deflector being located in advance of said line of initial engagement of said first cross bars with said sludge during operation of the apparatus and being shaped to engage under and lift the sludge at each side of said trough and turn said sludge laterally inwards during such operation.

References Cited in the file of this patent

UNITED STATES PATENTS

| | | |
|---|---|---|
| 113,221 | Stowell | Mar. 28, 1871 |
| 1,044,860 | Cole | Nov. 19, 1912 |
| 1,131,318 | Black | Mar. 9, 1915 |
| 1,502,430 | Hayes | July 22, 1924 |
| 2,907,124 | Graham | Oct. 6, 1959 |